Figure 1:
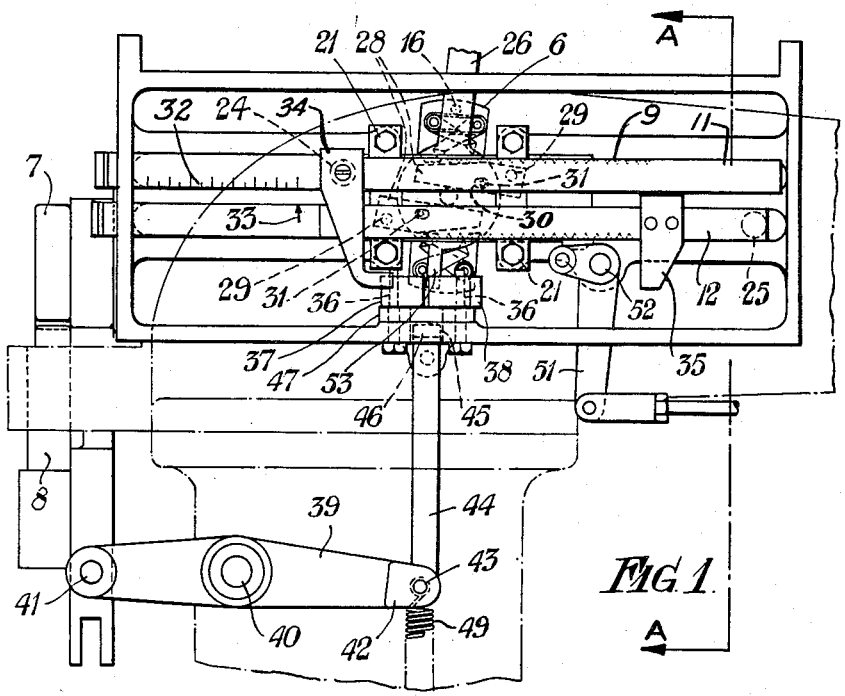
Figure 4:
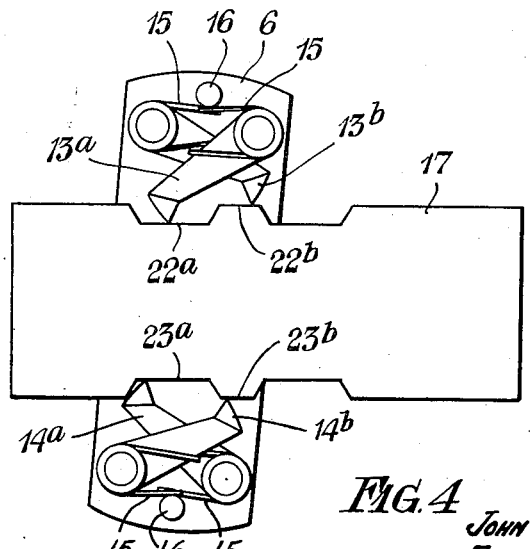

Inventors
JOHN IRVING NASMITH +
FLAVIUS KINGSFORD DANIELS
By Haseltine, Lake & Co.
Agents

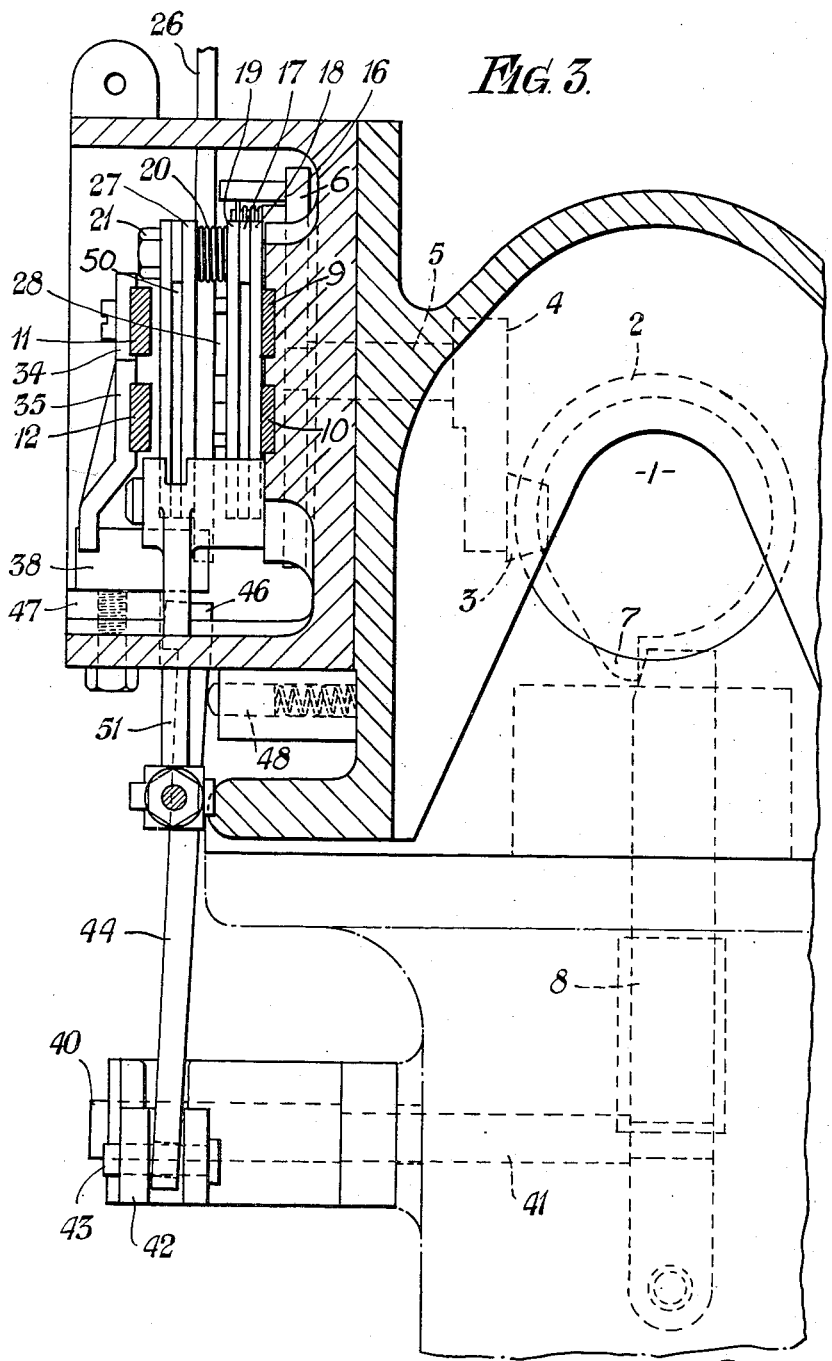

Jan. 13, 1953 J. I. NASMITH ET AL 2,625,245
DEFINITE POSITION RELEASE CLUTCH
Filed Oct. 29, 1947 3 Sheets-Sheet 3

Inventors
JOHN IRVING NASMITH +
FLAVIUS KINGSFORD DANIELS
By Haseltine, Lake & Co.
Agents Patented Jan. 13, 1953

2,625,245

UNITED STATES PATENT OFFICE 2,625,245

DEFINITE POSITION RELEASE CLUTCH

John Irving Nasmith and Flavius Kingsford Daniels, London, England, assignors to Vickers-Armstrongs Limited, London, England, a company of Great Britain Application October 29, 1947, Serial No. 782,822
In Great Britain October 7, 1946

Section 1, Public Law 690, August 8, 1946
Patent expires October 7, 1966

12 Claims. (Cl. 192—33)

This invention relates generally to automatic control mechanism for machines, and is concerned more particularly with machines which perform repeated cyclic working operations, such as for example the forming and driving of wire stitches. It is common practice to employ a so-called one-revolution clutch in machines of this kind, a single revolution of the clutch corresponding to a complete cycle of operation of the machine. The characteristic of a one-revolution clutch is that when the clutch has been engaged one revolution will be transmitted thereby before the clutch can be disengaged.

It is one object of the invention to devise automatic control means, adaptable for operation in conjunction with such a one-revolution clutch, whereby such control means may be set to permit the machine to perform a given number of cycles of operation.

It is a further object of the invention to devise an automatic control mechanism which will perform a given sequence of operations within a predetermined number of revolutions of a driven shaft, which mechanism is self reversing at the end of each sequence. A further object is to devise an automatic reversing control mechanism of the character indicated which is self arresting at the end of each sequence in a condition equivalent to its original position.

In accordance with the invention automatic control mechanism comprises a driven member, and a member or members that may be pre-set according to the number of cycles of operations that it is desired to have performed consecutively by the machine, the setting of such member or members being effective during the running of the machine, whereby after a predetermined number of cyclic operations have been performed the motion of the driven member is influenced in a predetermined manner, for example clutch throw-out mechanism is operated by said member or members such that the clutch does not transmit further motion and the cyclic operations of the machine cease. It may also be arranged that after a given number of operations have been performed the motion of the driven member is reversed. It is a characteristic feature of the invention however that whatever may be the number of operations for which the mechanism is pre-set, and whether that number be even or odd the control mechanism is restored after the operational sequence has been completed to a condition which is identical with or equivalent to its original condition.

In a preferred form of the invention a pawl and rack mechanism is driven from a clutch shaft so as to advance the rack in stepwise movements, and a stop carried by the rack trips a lever causing the clutch to disengage after a predetermined number of steps have been made. The connection between the pawl mechanism and the clutch shaft is conveniently effected by a cam on the clutch shaft which cam oscillates a pawl carrier plate by means of a crank. By an arrangement of two parallel racks and two pairs of pawls, one pair for each rack, both racks may be advanced one step for each clutch shaft revolution.

By means of a pawl reversing and rack masking plate, preferably operated by stops carried by the racks, the latter may be caused to perform equal sequences of steps first in one direction and then in the reverse direction, reversal of the pawls being effected at the end of each sequence by a shuttle action of the masking plate when struck by the said stops. By providing adjustable clutch throw-out stops on each rack, or by making the racks relatively adjustable, a sequence of any given length, corresponding to a given number of revolutions of the clutch shaft, within operational limits, may be performed by the racks before the clutch is disengaged.

The invention may be carried into effect in various ways, and by way of example an embodiment thereof suitable for application to a wire stitching machine is now described in conjunction with the accompanying drawings in which:

Fig. I is a front elevation of the mechanism.

Fig. II is a plan view thereof.

Fig. III is a sectional end view on the line A—A of Figure I.

Fig. IV is an elevation of the pawl and shuttle mechanism extracted from Figure I.

In these drawings the same parts are similarly numbered in the different figures. The frame of the machine is only partly indicated in the figures and only in so far as is necessary to assist in making clear the description.

Referring now to the drawings 1 represents the axis of a one-revolution clutch shaft of the machine, driving directly or indirectly the functional members of the machine, e. g. the stitch forming and stitch driving mechanism, such members being omitted from the drawings. The clutch shaft also drives the following mechanism: a barrel cam diagrammatically indicated at 2 is mounted on the clutch shaft. Cooperating with the cam 2 is a cam follower 3 on a crank 4, the shaft 5 of which is pivoted in the machine frame. Secured to the end of shaft 5 is a rocking plate 6, which when the clutch is put into action oscillates with an angular motion of suitable amplitude, determined by the cam 2, preferably symmetrically about a vertical centre line, see Figures I and IV. In Figure III is also indicated a one-revolution clutch pawl 7 rotating with the clutch shaft and operating, when engaged by the clutch bolt 8, to throw out the clutch.

In front of the rocking plate 6 are two notched racks 9 and 10 mounted in horizontal guides in the frame and having front extensions 11, 12 respectively. On the face of the rocking plate 6, near each extremity, is mounted a pair of pawls, 13a, 13b, and 14a, 14b respectively, see Figure IV, shaped to engage with the notches in the racks, 9 and 10, and biased by coil springs 15 the ends of which press against stops 16 carried by the rocking plate 6. A shuttle plate 17 is positioned in front of the notched racks and between friction plates 18, 19, against which press compression springs 20 on bolts 21. These friction plates serve to stabilize the movements of the racks and the shuttle plate, which movements will later be described, and also to prevent inertia effects from disturbing the accuracy of the said movements. The ends of the pawls which engage the racks are made wider than the racks so as to project also into recesses 22a, 23a, formed on the upper and lower edges of the shuttle plate 17, and level with the roots of the notches in the racks. These recesses are so formed, that if the shuttle plate is moved a certain distance to the right, one pawl of each pair is held out of engagement with the corresponding rack; whilst a movement to the left of the same amount holds the other pawl of each pair similarly out of engagement with the racks, and allowing their companion pawls to re-engage. The amount of movement of the shuttle plate to disengage one of each pair of pawls and engage the other of each pair, is equal to the pitch of the notches in the racks.

If the shuttle plate is moved the full amount to the right as shown in Figure IV, pawls 13a, 14a are operative and pawls 13b, 14b inoperative these latter resting on the lands 22b and 23b. When the rocking plate is in motion the engaged pawls will move the racks to the left one step equal to the pitch of the notches for every oscillation of the rocking plate, the motion being alternately top rack and lower rack, pawl 13a advancing the top rack one step when the rocking plate moves anti-clockwise, and pawl 14a advancing the lower rack one step when the rocking plate moves clockwise.

Similarly, if the shuttle 17 is moved the full amount to the left pawls 13b, 14b are operative and 13a, 14a inoperative, and when the rocking plate is in motion, the engaged pawls will move the racks to the right one step equal to the pitch of the notches for every oscillation of the rocking plate. The lower rack will then advance one step when the rocking plate moves anti-clockwise, and the top rack will advance one step when the rocking plate moves clockwise.

Near the left hand extremity of the top rack is provided a stop 24, so arranged as to come into contact with the left hand extremity of the shuttle plate at the end of the penultimate advance of the top rack when the motion of the racks is left to right; a similar stop 25, situated at the right hand extremity of the lower rack, is arranged to contact the right hand extremity of the shuttle plate at the end of the penultimate advance of the lower rack, when the motion of the racks is from right to left.

In each case the final step made by the rack moves the shuttle plate by means of the stop 24, or 25 respectively, a distance equal to one pitch of the notches, and reverse the engagement of the pawls as described. Thus any further oscillation of the rocking plate 6 causes the racks to advance in the reverse direction to that in which they were moving previously, and to continue in this direction until the shuttle plate is again shifted by the appropriate rack stop to again reverse the pawls, and so on.

The number of steps which the racks move in either direction is determined by the distance between the two rack stops, 24 and 25 and to enable this to be initially adjusted and set for the desired number of operations, a lever 26 is pivoted in a plate 27 carried on the bolts 21 and in contact with the springs 20. The lever 26 is pivoted co-axial with the rocking plate 6 and lies between the fixed plate 27 and the friction plate 19. Behind the lever 26 and between it and the friction plate 19 are provided two levers 28 pivoted at 29 in the plate 27; each lever 28 has an elongated hole or slot 30 which engages with a pin 31 projecting from the face of the lever 26. These connections are arranged so that a small anti-clockwise rotation of the lever 26 causes the two levers 28 to diverge.

As already described, the pawls which engage the notched racks 9 and 10 have their ends wider than the racks in order to project beyond them and co-operate with the recesses in the shuttle plate 17. The ends of the pawls project also beyond the shuttle plate so as to lie over and co-operate with the levers 28 when these are caused to diverge by rotating the lever 26. By this means all the pawls are disengaged from the racks, the latter being then free to be set in any desired longitudinal relationship. By providing a scale 32 on the front extension 11 of rack 9 and a registering pointer 33 on the other, the racks can readily be pre-set to perform any desired number of steps between reversals corresponding to the number of operations required every time the machine is started, between designed limits.

It will be clear that if now the racks are stopped after each movement of the shuttle plate and reversal of the rack pawls, the mechanism described will be in a precisely similar or at least an equivalent condition after each stoppage, and each time the machine is started the same number of operations will be performed, the racks travelling first in one direction and then in the other.

For the purpose of automatically stopping the mechanism after the predetermined number of steps, two stop plates 34 and 35 are secured to the front extensions of the upper and lower racks respectively and these co-operate alternately with and move two levers 37 and 38 respectively, these levers being mounted on vertically disposed pivots 36 provided in a catch plate 47 secured to the machine frame, the function of which catch plate will later be described. The relative positions of these levers and stop plates are such that the levers are operated at the same time as the shuttle plate is reversed; the stop 34 moving lever 37 at the end of the rack movement to the right, and stop 35 operating lever 38 at the end of the rack movement to the left. If the shuttle operating stops and the stops 34 and 35 are fixed in the appropriate positions on the racks, then only adjustment of the racks by the scale is necessary to set the mechanism for a given sequence. Alternatively the stops may be independently adjustable.

The movement of the levers 37, 38, by means and in the manner described serves to stop the machine at the completion of each series of rack movements as follows.

The one revolution clutch is put into driving operation by the withdrawal of the clutch bolt 8 from the clutch pawl 7, this being accomplished by any suitable independent means, for example operated by the entry of a blank to be processed, or by a treadle controlled by the operator. A lever 39 pivoted at 40 in the machine framing has one end coupled by means of a pin 41 with the clutch bolt 8, the other end of the lever being loosely linked by means of a fork 42 and stud 43 to a latch member 44 the upper end of which is laterally guided in a slot 45 in the framing and is in the form of a hook 46 adapted to engage, as further described, a catch plate 47 secured to the framing and on which are pivoted the stop levers 37, 38. A spring loaded plunger 48 pushes against the latch member 44. When the withdrawal of the clutch bolt puts the clutch into driving operation the rocking plate 6 commences to oscillate and moves the racks, and consequently moves the stop 34 or 35 away from the stop lever 37 and 38 as the case may be. The latch member 44 hooks on to the catch plate 47 and holds the clutch bolt 8 out of the path of the clutch pawl 7, the clutch thus continuing to drive the clutch shaft until the stop lever 37 or 38 is moved by its stop plate during the final advance of the racks in this particular direction. During this final advance the heel of the stop lever impinges against the hook 46 of the latch member 44 and pushes it off the catch plate, the spring 49 then causing the lever 39 to restore the clutch bolt to its original position, and at the completion of the revolution now being performed by the driving shaft the clutch pawl and bolt co-operate to throw the clutch out of action, and the series of operations of the machine is complete. Upon the next withdrawal of the clutch bolt, that one of the levers 37, or 38, which was last operated is restored to its original position by the next entry of the hook 46, under the influence of the spring plunger 48, over the catch plate.

The mechanism above described forms a self-contained and self-operated mechanism in accordance with the invention, which may be set to perform a sequence of a given number of operations each time the clutch is engaged.

Further, it will also be appreciated that it is possible to extend the use of this mechanism for the mechanical control of sequential operations. For instance, in the example illustrated, a cam plate 50 is shown adapted to slide alongside the fixed plate 27 and to operate a lever 51 pivoted at 52 in the course of the last three functional cycles in either direction of movement of the racks, and this may be utilised, by way of example, to control the action of a wire feed mechanism when the invention is applied to a wire stitching machine to place double stitches at the beginning and end of each series of operations.

Figure 2:
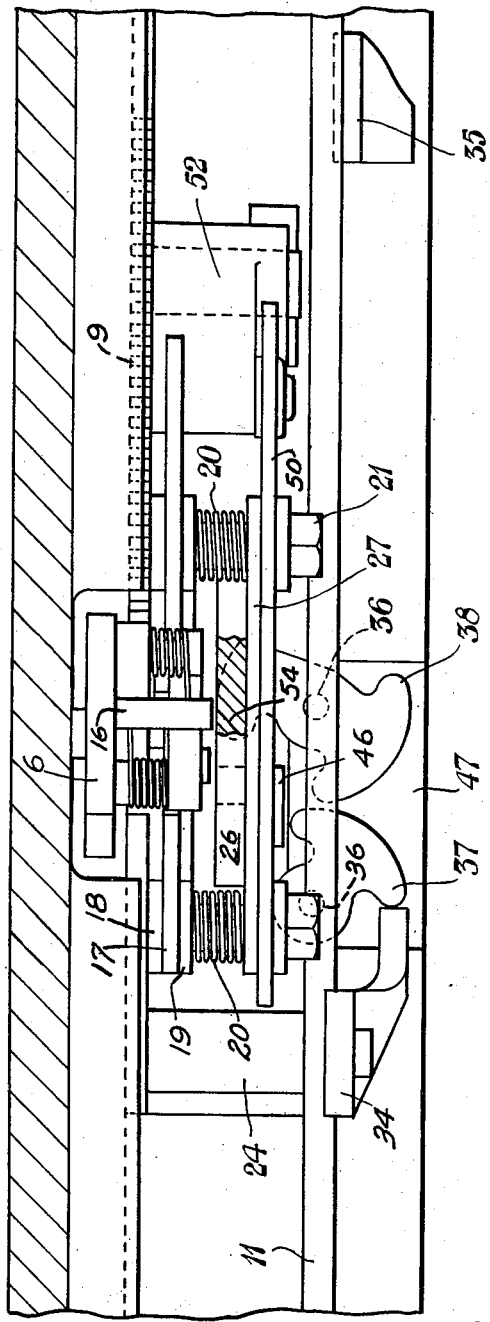

If it is desired to interrupt at any time the automatic sequence of operations, this may be effected by manually operating the lever 26, which disengages the pawls as already described and at the same time brings its projecting end 53 (Figure 1) into engagement with a nose 54 provided on the lever 38 (Figure 2) which pushes the hook 46 off the catch plate thus stopping the machine. When thus interrupted the unfinished sequence need not be completed, as the racks may now be re-set and a new sequence commenced, these features being of great utility in practice.

We claim:

1. Automatic control mechanism for performing a given sequence of operations within a predetermined number of revolutions of a driven shaft, comprising in combination, a pawl carrier oscillated in timed relation with said driven shaft, a pair of pawls on said carrier, a ratchet member driven stepwise in opposite directions when engaged by said respective pawls, stops carried by said ratchet member, pawl reversing and declutching means mounted in the path of said stops, said reversing and declutching means comprising a shuttle plate having notches and lands co-operating with said pawls and movable into two positions corresponding respectively to the declutching of the respective pawls, said shuttle plate being moved alternately into said positions by said stops after the ratchet member has travelled a predetermined number of steps.

2. Automatic control mechanism for performing a given series of operations within a predetermined number of revolutions of a driven shaft, comprising in combination, reversible drive pawls oscillated in timed relationship with said driven shaft, a ratchet member driven stepwise by said pawls, stops carried by said ratchet member, and pawl drive reversing means mounted in the path of said stops, said reversing means comprising a slidable shuttle plate having notches and lands co-operating with the drive pawls and slidable alternately by said stops after a predetermined number of steps performed by said ratchet member, to reverse the direction of motion of the ratchet member.

3. Automatic control mechanism for performing a given sequence of operations within a predetermined number of revolutions of a driven shaft, comprising in combination, a clutch on the driven shaft, reversible step-by-step driving means oscillated in timed relationship with said driven shaft, a driven member advanced by said step-by-step driving means to travel a predetermined distance between two end positions defined by stops carried by said driven member, and arresting and reversing means for said driven member, said arresting and reversing means comprising a slidable shuttle plate having parts co-operating with the step-by-step driving means and being operated by said stops in the end positions of the said driven member to momentarily arrest said driven member and reverse the direction of motion of said member by the step-by-step driving means, and means operable by the driven member in either one of its end positions to throw out said clutch.

4. Automatic clutch control mechanism comprising in combination a driving shaft, a driven shaft, a clutch between said driving and driven shafts, a reversible drive pawl oscillated in timed relationship with said driven shaft, a ratchet member driven stepwise by said pawl, stops carried by said ratchet member, pawl and drive reversing means mounted in the path of said stops, said reversing means being actuated alternately by said stops after a predetermined number of steps performed by said ratchet member, and clutch throw out means comprising a clutch actuating stop carried by the ratchet member, a lever in the path of said actuating stop, a latch member operable by said lever, a clutch bolt connected by a spring urged pivoted arm to said latch member, said lever, when engaged by the actuating stop carried by the ratchet member, releasing the latch member and permitting the spring urged pivoted arm to cause the clutch bolt to throw the clutch out of action.

5. Automatic control mechanism for performing a given sequence of operations within a predetermined number of revolutions of a driven shaft, comprising in combination, a pawl carrier oscillated in timed relationship with said driven shaft, two similar pairs of pawls mounted on said pawl carrier, two parallel racks co-operating with and driven stepwise by corresponding pawls of the respective pairs, stops on said racks for limiting the stepwise travel of said racks in opposite directions, pawl reversing and declutching means mounted in the path of said stops and having two positions corresponding respectively to the declutching of the respective pawls, said pawl declutching means being actuated alternately by said stops after the racks have performed a predetermined number of steps, one pawl of each pair being operative on its respective rack to move both said racks in the same direction when the pawl declutching means is in one position, and the other pawl of each pair being operative on its respective racks to move both of said racks in the reverse direction when the pawl declutching means is in the other position.

6. Automatic control mechanism for performing a given sequence of operations within a predetermined number of revolutions of a driven shaft, comprising in combination, a pawl carrier oscillated in timed relationship with said driven shaft, two similar pairs of pawls mounted on said pawl carrier, two parallel racks co-operating with and driven stepwise by corresponding pawls of the respective pairs, stops on said racks for limiting the stepwise travel of said racks in opposite directions, pawl reversing and declutching means mounted in the path of said stops and having two positions corresponding respectively to the declutching of the respective pawls, said pawl declutching means being actuated alternately by said stops after the racks have performed a predetermined number of steps, one pawl of each pair shifting its respective rack one step for each oscillation of the pawl carrier, and said steps being performed alternately by the said racks in successive half oscillations of said carrier.

7. Automatic control mechanism for performing a given sequence of operations within a predetermined number of revolutions of a driven shaft, comprising in combination, a pawl carrier oscillated in timed relationship with said driven shaft, two similar pairs of pawls mounted on said pawl carrier, two parallel racks co-operating with and driven stepwise by corresponding pawls of the respective pairs, stops on said racks for limiting the stepwise travel of said racks in opposite directions, pawl reversing and declutching means mounted in the path of said stops and having two positions corresponding respectively to the declutching of the respective pawls, said pawl declutching means being actuated alternately by said stops after the racks have performed a predetermined number of steps, manual pre-setting means for said racks, said pre-setting means comprising a pair of pawl lifting members arranged symmetrically on either side of the axis of oscillation of said pawl carrier and operable for lifting both pairs of pawls clear of the racks so that the latter may be displaced relatively to each other for pre-setting the length of travel in terms of any whole number of steps.

8. Variable automatic control mechanism comprising in combination, a driving shaft, a clutch connected with said driving shaft and arranged for driving the mechanism to be controlled, an auxiliary shaft driven from said clutch, a reversible step-by-step actuating device driven from said auxiliary shaft, a displaceable member arranged for stepwise displacement in opposite directions by said reversible step-by-step actuating device, adjustable stop means associated with said displaceable member to adjustably limit its displacement through a predetermined number of steps in either direction in terms of the number of operations to be performed by said mechanism to be controlled, means operable by said displaceable member for throwing out said clutch when said displaceable member reaches a limit position, and means operatively connected with said mechanism to be controlled for cancelling the effectiveness of said means for throwing out said clutch, the arrangement being such that when said displaceable member has completed its predetermined displacement to said limit position and thereby operated said means for throwing out the clutch, the automatic control mechanism is in a condition equivalent to that which obtained when said displaceable member was in its initial position at the commencement of said displacement, and the automatic control mechanism is in a condition to control a repetition of the same number of operations.

9. Variable automatic control mechanism comprising in combination, a driving shaft, a clutch connected with said driving shaft and arranged for driving the mechanism to be controlled, an auxiliary shaft driven from said clutch, a reversible step-by-step actuating device driven from said auxiliary shaft in timed relationship with said driving shaft, a displaceable member arranged for displacement in opposite directions by said reversible step-by-step actuating device, stop means on said displaceable member for limiting the number of steps to be performed by said displaceable member in terms of the number of operations required to be performed by said mechanism to be controlled, arresting and reversing means for said displaceable member, said arresting and reversing means comprising a displaceable plate co-operating with said reversible step-by-step actuating device, said plate being disposed in the path of, and actuated by, said stop means, means operable by said displaceable member for throwing out said clutch when said displaceable member reaches a limit position, and means operatively connected with the mechanism to be controlled for cancelling the effectiveness of said means for throwing out said clutch, the arrangement being such that when said displaceable member has been displaced through the predetermined number of steps to reach said limit position to throw out said clutch at the completion of one sequence of operations performed by said mechanism to be controlled, the automatic control mechanism is in a condition equivalent to that which obtained when said displaceable member commenced said displacement, and said automatic control mechanism is in an initial condition to control a repetition of the same sequence of operations.

10. Variable automatic control mechanism comprising in combination, a driving shaft, a clutch connected with said driving shaft and arranged for driving the mechanism to be controlled, an auxiliary shaft driven from said clutch, a reversible step-by-step actuating device driven from said auxiliary shaft in timed relationship with said driving shaft, a displaceable member arranged to be driven in opposite directions by said reversible step-by-step actuating device, stop means on said displaceable member for limiting the number of steps to be made by said displaceable member in either direction in terms of the number of operations to be performed by said mechanism to be controlled, arresting and reversing means for said displaceable member, said arresting and reversing means comprising a displaceable plate co-operating with said reversible step-by-step actuating device, and disposed in the path of, and actuated by, said stop means, means operable by said displaceable member for throwing out said clutch when said displaceable member reaches a limit position, said means for throwing out the clutch comprising a clutch actuating stop carried by said displaceable member, a lever mounted in the path of said clutch actuating stop, and a mechanical connection between said lever and said clutch, the arrangement being such that when said displaceable member has completed the predetermined step-wise travel to reach said limit position and throw out said clutch at the completion of one sequence of operations of said mechanism to be controlled, the automatic control mechanism is in a condition equivalent to that which obtained when said displaceable member commenced said step-wise travel, and the automatic control mechanism is in an initial condition to control a repetition of the same sequence of operations.

11. Variable automatic control mechanism as claimed in claim 10, wherein the said displaceable member is adjustable with said clutch actuating stop to locate said stop in a desired position.

12. Variable automatic control mechanism comprising in combination, a driving shaft, a clutch connected with said driving shaft and arranged for driving the mechanism to be controlled, an auxiliary shaft driven from said clutch, a reversible drive pawl device driven from said auxiliary shaft and oscillated in timed relationship with said driving shaft, two parallel rack members co-operating with and driven stepwise by pawls carried by said reversible drive pawl device, stop means on said rack members for limiting the stepwise travel of said racks between two end positions spaced according to the number of operations required to be performed by said mechanism to be controlled, and means operable by said rack members for throwing out said clutch when said rack members reach an end position, the arrangement being such that when said rack members reach one of said end positions upon the completion of a required number of operations performed by said mechanism to be controlled, the control mechanism is in a condition equivalent to that which obtained in the other of said end positions, and the control mechanism is in an initial condition to control a repetition of the same number of operations by said mechanism to be controlled.

JOHN IRVING NASMITH.
FLAVIUS KINGSFORD DANIELS.

REFERENCES CITED

The following references are of record in the file of this patent:

UNITED STATES PATENTS

| Number | Name | Date |
| --- | --- | --- |
| 1,312,091 | Arter | Aug. 5, 1919 |
| 1,397,401 | Buterworth et al. | Nov. 15, 1921 |
| 1,652,705 | Daly | Dec. 13, 1927 |
| 2,215,990 | Anderson | Sept. 24, 1940 |
| 2,281,300 | Waldo | Apr. 28, 1942 |